(12) United States Patent
Kawamura

(10) Patent No.: US 7,554,303 B1
(45) Date of Patent: Jun. 30, 2009

(54) CONTROLLER OF PERMANENT MAGNET GENERATOR

(75) Inventor: Hideo Kawamura, 8-13-5, Okada, Samukawamachi, Kohzagun, Kanagawa (JP) 253-0105

(73) Assignees: Hideo Kawamura, Kanagawa (JP); Megumi Kawamura, Kanagawa (JP)

( * ) Notice: Subject to any disclaimer, the term of this patent is extended or adjusted under 35 U.S.C. 154(b) by 0 days.

(21) Appl. No.: 12/192,384

(22) Filed: Aug. 15, 2008

(30) Foreign Application Priority Data

May 15, 2008 (JP) ............................. 2008-127862

(51) Int. Cl.
*H02P 9/14* (2006.01)
(52) U.S. Cl. ............................. 322/46; 102/52; 102/59
(58) Field of Classification Search .................. 322/10, 322/46, 52, 59
See application file for complete search history.

(56) References Cited

U.S. PATENT DOCUMENTS

| 6,034,511 | A | 3/2000 | Scott et al. |
| 6,541,887 | B2 | 4/2003 | Kawamura |
| 7,388,300 | B2 * | 6/2008 | Anghel et al. ................. 290/39 |
| 7,501,799 | B2 * | 3/2009 | Rozman et al. ............... 322/46 |

* cited by examiner

*Primary Examiner*—Nicholas Ponomarenko
*Assistant Examiner*—Iraj A Mohandesi
(74) *Attorney, Agent, or Firm*—Notaro & Michalos P.C.

(57) ABSTRACT

The controller of permanent magnet generator controls the current by using control switch which is installed in between power coil and control coil and switches on and off in switches in order to generate two different voltage and increase the power at very low speed condition of generator. The controller controls the voltage of power coil constantly by adjusting current of flowing in the control switch which the voltage is sensed on the load voltage sensor and the controller control the voltage constantly at very small speed by using power switches furthermore, the controller controls the two kind of voltage in power coils constantly by using control switch and switches in case of the generator having different kind of voltages.

16 Claims, 9 Drawing Sheets

CONTROLLER OF PERMANENT MAGNET GENERATOR

TECHNICAL FIELD

The present invention relates to a permanent magnet generator with a controller to maintain constant voltage, which is comprised of a rotor installed permanent magnet pieces supported for rotation in a stator housing, a stator surrounding around an outside periphery of the rotor, stator coils contained a power and a control coil and controller to keep a voltage constantly.

BACKGROUND OF THE INVENTION

So far, the improvement of efficiency in a generator has been big problem in the requirement of energy saving. In the structure of the generator, electrical magnet is used for a rotor mainly, which is produced magnetic force by flowing current in a coil installed in the rotor. They know well that the efficiency is improved on the generator by use of a permanent magnet rotor because it is no need to use a current for producing magnetic force. However it has been difficult to use the permanent magnet (PM) generator for such as automotive vehicle because the generated voltage is changed up and down as generator speed change. The reason is that the magnetic force must be reduced to smaller value to maintain constant voltage however the magnetic force dose not change.

However many researchers are making effort to develop the PM generator. Because structure is very simple and generated power is very big in spite of small size due to very strong magnetic force, then PM generators are used for automotive and wind turbine and those have been increasing recently. In the PM generator and motor system, the function of motor can respond to the change of voltage in case of using electric power generated in PM generator, however it is need to control voltage constantly in the case of using electric power for many electric equipments and connecting a storage battery. Many researchers have carried out to research how to control the voltage constantly in PM generator, and the method of controlling the voltage constantly used switching regulator was developed by GM however the system had big problems such as large size of controller, expensive and low efficiency. In order to make the voltage constantly, the electric voltage should be chopped in the switching regulator which is used big size of power transistors, as the result the system was increased in the size, cooling system and cost. On the other hand, the spike of current sometimes produced when the electric power was chopped and the spike pulled the trigger of obstacle in a radio wave then the countermeasure of noise become very difficult problems.

The methods of reducing the magnetic force of permanent magnet when the rotor speed increased were studied by many researchers. For example, the controllers used reactive power were developed, which was needed big size of a converter and a reactor, on the other hand, generators installed coils in the stator in addition to power coil in parallel were developed, which was no need mechanical control systems and the structure was simple because of small number of parts, having reliability and the excellent control-ability of voltage in power coil, they said. In the prior PM generator, it is composed of stator with winding coils, rotor having permanent magnet pieces and control coil supplied current from inverter and the current flowing into the control coil produce magnetic force in optically direction in order to reduce magnetic force to flow into stator and the voltage, which is disclosed in Japanese Patent Application Laid-Open Publication No. 2004-320972.

Furthermore, the generator realized high efficiency was proposed. Prior generator is consisted of stator with winding coil and rotor having permanent magnet pieces and iron cores then controller makes the magnetic force reduce by using reluctance power which is produced the magnetic force on non-symmetrical position disclosed in Japanese Patent Application Laid-Open Publication No. 2003-245000.

Other patent was opened that is consisted rotor installed permanent magnet pieces, stator with coils, and secondary magnetic coils set up in a right angle against the circuit of PM flux to control voltage or current of the power disclosed in Japanese Patent Application Laid-Open Publication No. 2006-529076.

However it is very difficult to weaken magnetic force of permanent magnet in response to increasing rotor speed to the higher by using the methods mentioned above and those technologies have not realized in practical use. On the other hand, DC-DC converter is used for hybrid vehicles, in the system, DC electric power rectified from the generator is chopped by controller and it is transferred to DC power having a constant voltage set in advance furthermore the DC power is changed to AC power by using a inverter. However those were disturbed by complicated and large size of the system to be diffused them in the automotive market. On the other hand, energy problems become worse recently, and about 50% efficiency in the Lundell type generator has not permitted yet in conventional vehicles. As the result, a generator which has simple structure and simple and certain controller is required strongly in the social situation.

The generator with stator wound two kind of coils and one side of coil was used for controlling magnetic force by flowing the current to produce magnetic force in opposed direction were developed by many researcher. In order to reduce the magnetic flux of PM force which flows into stator, the magnetic flux produced by current flowing from an inverter need to be similar shapes to PM flux, however those techniques were very difficult. Furthermore, those electric magnetic flux opposed to PM flux makes the magnetic force of PM material reduce and they suffered with the trouble of generator.

The purpose of the present invention is to solve the problems mentioned above and the generator with complicated structure such as magnetic force control systems is not used and the generator voltage is continuously maintained the voltage set in advance by used small control current and which system dose not affect the magnetic force reduction of permanent magnet then the winding coils are composed power coils having small winding number and control coil with larger winding number than power coil and the power coil connected with control switch, control coil and solenoid coil in series, which switch are located between power coils and control coil and the solenoid coil is not included in the stator, furthermore a controller is connected with control coils and power coils to control the voltage generated in the power coil constantly which is respond by the sensor of voltage installed output terminals and the controller makes the control switch flow small amount of current into control coil.

SUMMARY OF THE INVENTION

In order to achieve the object, a controller of a permanent magnet generator in accordance with the present invention comprises: a rotor shaft rotatably supported by a housing; a rotor fixed to the rotor shaft, and mounted with a plurality of permanent magnet members on an outer periphery side; and a stator disposed at the outside of the rotor and wound with a winding coil; wherein the winding coil of the stator is formed of a power coil and a control coil connected in series to the power coil and larger in the number of windings than the power coil, and a power terminal is provided at least between the power coil and the control coil, and a switch for letting flow a part of a current generated in the power coil to the control coil and a controller for controlling a current amount flowing into the control coil by controlling ON/OFF of the switch so that a generated voltage is controlled to a voltage set in advance in response to a detection signal from a sensor for detecting the generated voltage by the power coil are provided.

Here, in the controller of the permanent magnet generator according to the present invention, it is preferable that the power coil is connected in series with a plurality of winding coils, and a plurality of power terminals are provided.

Moreover, in the controller of the permanent magnet generator according to the present invention, it is preferable that the power coils are the plurality of winding coils mutually different in the number of windings, and the plurality of power terminals output mutually different voltages.

And, in the controller of the permanent magnet generator according to the present invention, it is preferable that the control coil comprises a solenoid coil disposed at a position not interlinked with a magnetic flux of the rotor.

And, in the controller of the permanent magnet generator according to the present invention, it is preferable that the switch is disposed between the power coil and the control coil.

Moreover, in the controller of the permanent magnet generator according to the present invention, it is preferable that the power coil and the control coil are connected by star-connection or delta-connection as a three-phase AC generator, the end portion of the solenoid coil is connected in a star shape, and the power terminals of U, V, and W phase of the three-phase AC are connected to a rectifier, respectively, a load is sent with a power, and the power coil is provided with the power terminal of a single voltage or a plurality of different voltages.

And, in the controller of the permanent magnet generator according to the present invention, it is preferable that the plurality of power terminals of the power coil are provided with a power switch for performing output switching, respectively, and the controller performs a control such that, when a rotational speed of the rotor is low, the power switch of the power terminal by the side of the large number of windings of the power coil is turned ON, and at the same time the power switch of the power terminal by the side of the small number of windings of the power coil is turned OFF, and when the rotational speed of the rotor is high, the power switch of the power terminal by the side of the small number of windings of the power coil is turned ON, and at the same time the power switch of the power terminal by the side of the large number of windings of the power coil is turned OFF.

Here, in the controller of the permanent magnet generator according to the present invention, a voltage of the power terminal of the power coil and a voltage of the control coil have a relationship of the output side voltage=the control side voltage×(the output side number of windings)/(the control side number of windings), and can increase and decrease the current amount flowing into the control coil by the switch.

And, in the controller of the permanent magnet generator according to the present invention, it is preferable that the controller regulates the current amount flowing into the control coil by duty-controlling the switch and controls the generated voltage to the voltage set in advance.

And, in the controller of the permanent magnet generator according to the present invention, it is preferable that the controller duty-controls the switch in response to the detection signal form the sensor, when the generated voltage is high, increases the current amount flowing into the control coil, and when the generated voltage is low, decreases the current amount flowing into the control coil, thereby controls the generated voltage to the voltage set in advance.

Moreover, in the controller of the permanent magnet generator according to the present invention, it is preferable that the plurality of power terminals of the power coil are provided with a power switch for performing output switching, respectively, and the controller, based on the output voltage of the power terminal connected with a main power source, controls the current amount flowing into the control coil, thereby obtains the voltage set in advance.

Additionally, in the controller of the permanent magnet generator according to the present invention, it is preferable that the controller performs a control such that, when the main power source is required to supply an excessive power, the power switch provided in the power terminal connected with the main power source is turned ON and the other power switch is turned OFF.

Moreover, in the controller of the permanent magnet generator according to the present invention, it is preferable that the plurality of power terminals for outputting different voltages are connected with either of a rectifier or a storage battery, respectively, the controller controls the current amount flowing into the control coil in response to a variation of a voltage of a load of the rectifier or the storage battery which is a main power source, and controls the generated voltage to the voltage set in advance.

And, in the controller of the permanent magnet generator according to the present invention, it is preferable that the power terminal of the power coil is provided with a generator side switch for ON/OFF-controlling a connection with the power terminal and a load by an instruction from the controller of the generator side and an electric motor side switch for ON/OFF-controlling a connection with an electric motor side storage battery and the power terminal by an instruction from an electric motor side controller, and the switch and the generator side switch are turned OFF by the instruction from the generator side controller, the electric motor side switch is turned ON by the instruction from the electric motor side controller, and while detecting a position of the rotor, the power coil is supplied with a current from the electric motor side storage battery, thereby drives the rotor.

Moreover, in the controller of the permanent magnet generator according to the present invention, it is preferable that the power terminals provided in the plurality of power coils different in the number of windings are directly connected in series to an electric motor side switch and a storage battery connected in series, and the electric motor side switch is controlled by the controller so that the current flows to the power coil selected in response to a signal of a rotational speed.

Furthermore, in the controller of the permanent magnet generator according to the present invention, it is preferable that the controller performs a control such that, when a driving force is increased in a state in which a number of rotations of the rotor is large, the electric motor side switch connected to the power coil of the small number of windings is closed so as to supply the current, and at the same time, the electric motor side switch connected to the power coil of the large number of windings is opened, and when the driving force is increased in a state in which the number of rotations of the rotor is small, the electric motor side switch connected to the power coil of the large number of windings is closed so as to supply the current, and at the same time, the electric motor side switch connected to the power coil of the small number of windings is opened.

The controller of the permanent magnet generator which composed with winding coil having small winding number for power coil and larger winding number whose coils are connected in series, and than power coil connected with the control coil in series, adjust the current flowing into the control coil which used the character of reducing voltage largely by flowing small current in the control coil having a large number of windings to maintain constant voltage in the power coil. Generally, the voltage of winding coil reduces it when generated current increase, and the winding number of coil increase larger, the ratio of downward voltage larger as shown in FIG. 2. Those two kind of coils are installed in parallel in the many further disclosed in Japanese patents, and they tried to control the power coil voltage by flowing current into the coil having a large number of windings, however large amount of current is required to reduce the magnetic force even if the control coil winding number is very large, then they have not succeeded in the technologies. However when small winding number of coil for power coil is connected with large winding number for control coil in series in order to produce opposite electromotive force in the coil, as shown in the invention, we can control the power coil voltage due to flowing current into the control coil, because the voltage of winding coil in the generator is in proportion to winding number and power coil voltage follow the changing the voltage of control coil directory. In other wards, when it is set up that N1 is small number of windings in power coil and N2 is large number of windings in control coil, the voltage V1 of power coil is the value in the equation shown as following: V1=V2×N1/N2 The equation is shown as follows.

$$E_0 = 4.44 \cdot \Phi \cdot f \cdot W_s \quad (1)$$

$$E = E_0 - I_1 \cdot (R_1^2 + (2\pi \cdot f \cdot L_1/1000)^2)^{1/2} - I_2 \cdot (R_2^2 + (2\pi \cdot f \cdot L_2/1000)^2)^{1/2} \quad (2)$$

$E_0$: voltage of electromotive force

E: terminal voltage $\Phi$: magnetic force f: frequency of generating

Ws: winding number of coil $I_1$: current of power coil $I_2$: current of control coil $R_1$: resistance of power coil $R_2$: resistance of control coil $L_1$: inductance of power coil $L_2$: inductance of control coil The voltage of electromotive force is calculated by equation (1) and the current of control coil is calculated by equation (2).

According to the calculation, the winding number is larger, the current of control coil become to smaller. As terminal voltage is decided by the value subtracted the product of current and inductance from the voltage of electromotive force, the voltage of power coil can be controlled by flowing current in either of coils.

DETAILED DESCRIPTION

A generator controlled voltage by winding coil combined with control coil and power coil in accordance with the present invention will be hereinafter described with reference to the accompany drawings.

Figure 1A:
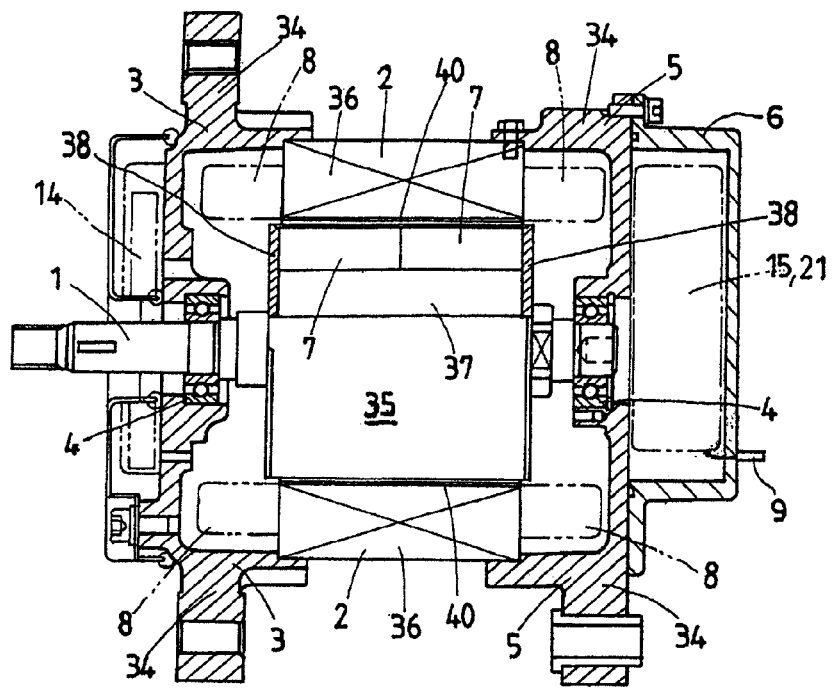
FIG. 1A is a front view, and the structure of generator with the controller in accordance with the present invention is shown in this picture.
Figure 1B:
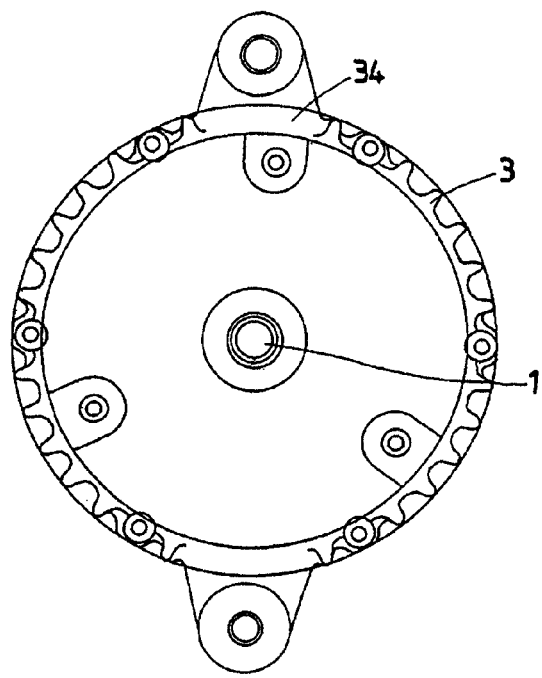
FIG. 1B is a side view, and the structure of generator with the controller in accordance with the present invention is shown in this picture.

The permanent magnet generator controlled voltage by winding coils as shown in FIG. 1, is comprised of stator hosing 34 which is a pair of housing halved housing 3 and 5, a rotor shaft 1 supported for rotation in the housing 3 and 5 by means of a pear of axially opposite ball bearings 4, a rotor 35 of a multi-polar permanent magnet member 7 in which more than one platy permanent magnet pieces is arranged circumferentially around the rotor shaft 1, a stator 2 arranged around the outer periphery of the rotor 35. The stator 2 is composed by stator core 36 and rolled up by electromagnetic coils 8 arranged in stator core 36. An equipment of driving such as pulley is fixed to the end of rotor shaft 1, which is not shown in FIG. 1. The rotor shaft 1 is composed of a magnetic permeable member 37 arranged on the rotor shaft 1 and the permanent magnet member 7 of more than one permanent magnet piece extended axially. Furthermore, around the outside periphery of the permanent magnet member 7 there is provided a first reinforcing member 40 to keep the permanent magnet member 7 against falling off the rotor 35 owing to a high centrifugal force, the reinforcing member 40 being made of high tensile fibers made of resin. The rotor 35 is clamped between axially opposite backing plate 38 and flange and fixed by nut such as tightening tools in integration. In the generator, rectifier 15 is installed in the rear housing 5, and a solenoid coil 14 is set up in outer side of the front housing 3. The stator coils 8 are wound in the slot of the stator core 36 which are embedded between the teeth of combs and non-magnetic materials such as resin is inserted in gap of the slot to be fixed the stator coils 8.

The one example of controller with the present invention enforced in the experiment will be hereinafter explained with reference to the accompanying drawing FIG. 3.

Stator coil 8, for example, are wound in the slot of stator core 36 and the power coils 10 and control coil 11 are connected with the control switch 12 and solenoid coil 14 in series which is one of example of currying out the present invention and the coil line are connected with three-phase such as star-connection which is also connected with a neutral point 39 as starting point. The power switch 13 is connected with the terminal which a wire 41 connects, rectifier 15, and load 17 in series. Three terminals which the wire 41 connects to each are connected with the rectifier 15 with three-phase and DC electric power produced in the rectifier 15 is sent to the load 17 for single-phase. A sensor of voltage and load 16 is located with the load 17 in parallel and the sensor for speed and position of pole produced by permanent magnet members 7 is arranged on the near of the rotor 35. The signals sent from the sensor of voltage and load 16 and the speed and position sensor 28 is inputted to the controller 18 then the controller 18 sends open and close signals to the control switches 12 and power switches 13 to control the voltage constantly. Furthermore, it is better that the control switch 12 is installed between the power coil 10 and the control coil 11 because of the improving the resistance of high voltage, however it is possible to install it between the control coil 11 and solenoid coil 14. And, in this embodiment and the following embodiments, the power coil 10 may be constituted by connecting two or more winding coil in parallel, then the power coil 10 of this parallel connection and the control coil 11 may be connected in series. In this case, it has the advantage that each winding coil which is connected in parallel and used as the power coil 10 can be made small.

In order to maintain small level amplitude of the voltage on the control switches 12, the solenoid coil 14 is connected with the control coil 11 in series, because the solenoid coil 14 makes the current of flowing into control coil 11 reduce dramatically due to large inductance of the solenoid coil 14 when the load 17 and the rotor 35 speed are changed quickly.

Therefore, it is very important invention items to arrange the solenoid coil 14. On the other hand, control switches 12 are arranged on the coils between power coil 10 and control coil 11, because receiving the spike with high voltage is brought the breakage of control switches 12 then arranging the control switch 12 on the coils between the power coil 10 and the control coil 11 is very important because the voltage of the control switch 12 do not increase on this position. Then it is need to arrange the solenoid coils 14 in a position which is no inter-linkage with the magnetic force of the rotor 35. Then the solenoid coil 14 is put in the out side of housing 34 as showing in FIG. 1. In order to stabilize the voltage of power coil terminal, condenser is inserted sometimes between the terminals. Then it is better that the end of control coils 11 are connected with solenoid coils 14 and another end of solenoid coils are connected with each other for natural point.

Figure 2:
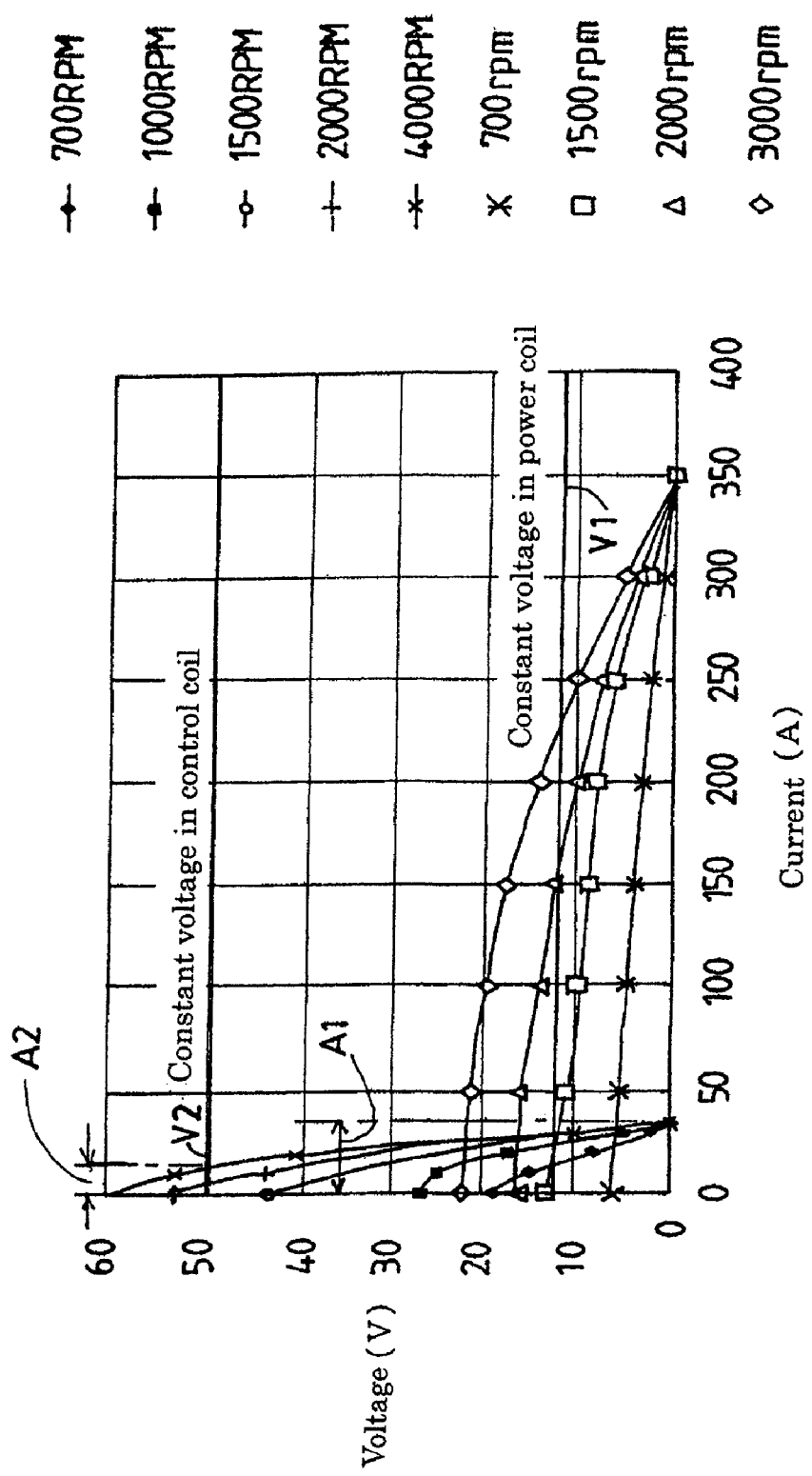
FIG. 2 is the character of voltage and current in the generator coil having large winding number and small winding number is shown in the graph.

The controller 18 makes the control switch 12 increase and decrease the periods of closing time to control the current to maintain the voltage constantly when the current generated in the power coil 10 flow into the control coil 11, the voltage of power coil 10 is controlled without any other complicated controller. If the solenoid coil is eliminated from the circuit, the voltage of the coils reduced 0 volt in case of closing the control switch 12 because the current flow A1 ampere into the control coil 11 as shown in FIG. 2. However, the current flowing into the control coil 11 is reduced to A2 ampere in case of arranging solenoid coil 14 having large inductance value, as the result, the amplitude of voltage reduce and the voltage of power coil 10 become stable condition even if the control switch 12 is opened and shut in high frequency. Furthermore, cupper loss is reduced because of reducing the current flowing into the control coil 11 and solenoid coil 14. The solenoid coil 14 is very effective to reduce the cupper loss because the high resistance due to high frequency in the solenoid coil 14 is wattles resistance. When the current flowing into control coil 11 is A2 ampere, the voltage of power coil 10 is V1 which is calculated following equation $V1=V2 \times N1/N2$ then the voltage of power coil 10 can be controlled by changing the current from 0 to A1 ampere as shown in FIG. 2.

If a magnetic force controller such as air gap control system is installed this system, the current flowing into the control coil is reduced and efficiency of the generator is improved much more.

Figure 4:
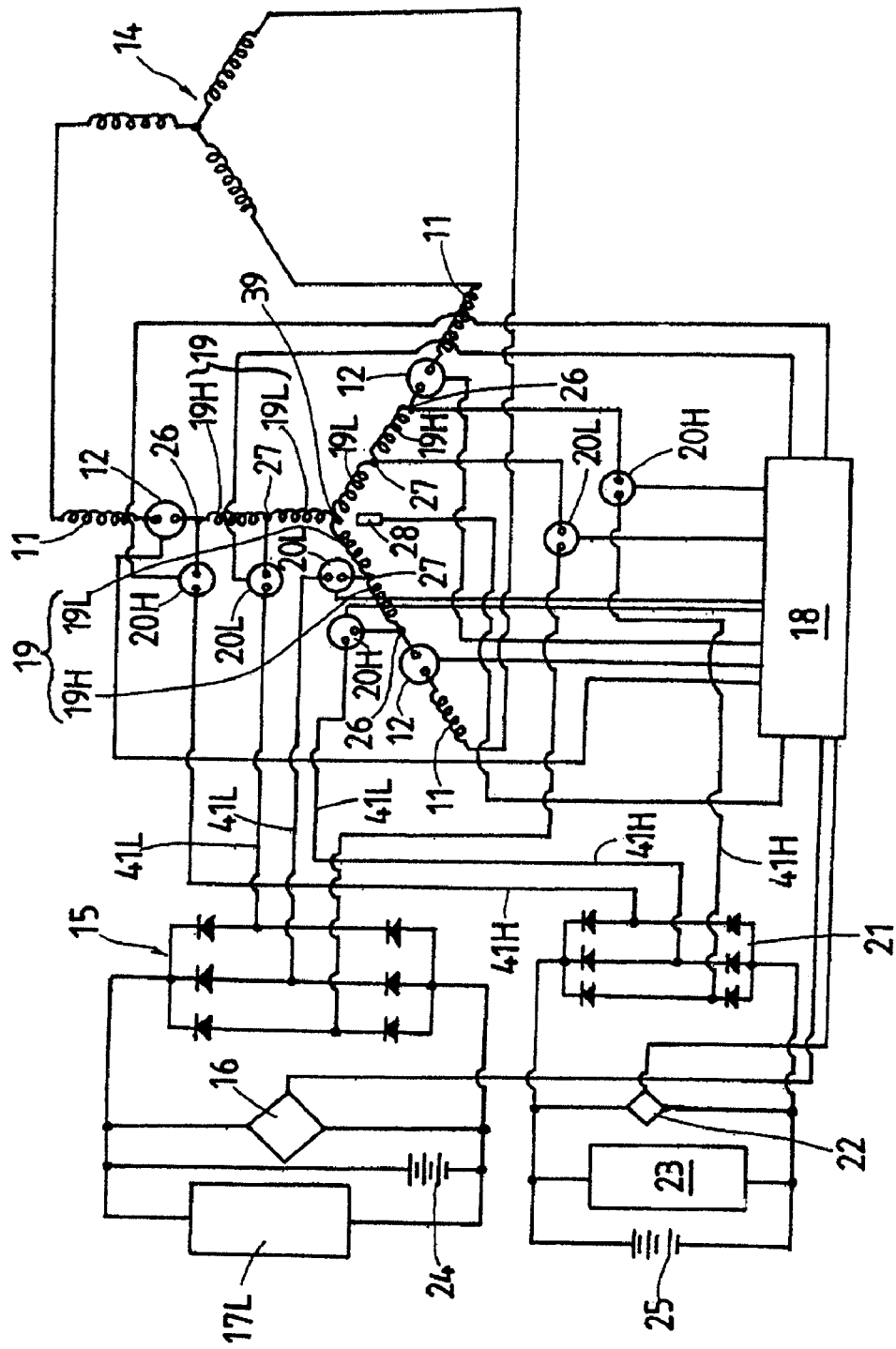
FIG. 4 is a wiring diagram explaining an example of other circuit connection in the generator and controller in an aspect of the present invention is shown in this drawing.

In another aspect of the present invention, the controller of generator for generating two kinds of power with different voltages is explained by using FIG. 4. The generator of this aspect has a plurality of terminals which voltage differs and wire 41L or 41H connects to each so that it may correspond to the load with low voltage 17L and the load with high voltage 23. In this aspect, for example, the power coil 10 is composed two kinds of winding coils 19H and 19L. The power coil for lower voltage 19L is connected with terminal 27, switch 20L, wire 41L, rectifier 15 and load 17L in series and the sensor of voltage and load 16 and a storage battery 24 are arranged in the load 17L in parallel. The power coil for higher voltage 19H is connected with terminal 26, switch 20H, wire 41H, rectifier 21, and load 23 in series and the sensor of voltage 22 and storage battery 25 are arranged in load 23 in parallel. In this aspect, for example, the power coil for lower voltage 19L is for automotive power source with 12V and the power coil for higher voltage 19H is for the equipment to drive electric machines such as motor for compressor driven by 100V or 200V. The control coil 11 and control switch 12 is connected with the power coil for higher voltage 19H in series. For example, when the ratio of winding number in the power coil for lower voltage 19L, the power coil for higher voltage 19H and the control coil 11 is decided as following ratio of 12:100:400, the ratio of voltage in the each terminals appeared in the ratio of 12:100:400 V, then we can get 12V in the power terminal for lower voltage 27 and 100 v in the terminal for higher voltage 26 in case of controlling the voltage of 400V in the end of the control coil 11 even if the load is changed in what kind of conditions. In an aspect of another invention, power coils arranged in a stator to get two kind of voltage, however they could not obtain the stable different voltage because the voltage of another power side reduced by effecting from the power side supplied large electric power. In the generator in aspect of the present invention, we can get the stable the voltage set in advance in each terminal till the current flowing into the control coil 11 is reduced to 0 ampere. Furthermore, the case of generator having plural power coils which have different voltages is explained, for example, however it is possible to use plural power coils with same winding number for same voltage using.

The control switch 12 is arranged in the coil between the power coil for higher voltage 19H and control coil 11 and the control coil 11 is connected with solenoid coil 14. This arrangement is very important in the invention. The voltage of control coil 11 in the solenoid coil 14 side is increased above 400V because the winding number of control coil 11 is very large. If the control switch 12 is inserted in the coil end between control coil 11 and solenoid coil 14, the voltage in the control switch 12 increase 1000V when the switch is opened and the current flowing to control coil 11 reduce to 0 ampere. However, the voltage of the control switch 12 remain 100V when the control switch 12 is inserted in the coil 26 between the control coil 11 and the power coil 19 and the solenoid coil 14 having large resistance connected with the control coil 11 in series. The large spike of voltage dose not appear in case of making the control switch 12 open and close when the control switch 12 and the solenoid coil 14 are arranged in the position 26 as mentioned above. It is very important technology and feature that the voltage in control switch 12 is maintained in low level because the contact point of control switch 12 is received damage by the spike of high voltage. When the controller 18 makes the control switch 12 arranged in the coil having large inductance work for chopper which has the function of duty-controlling in order to keep constant voltage by the signal from the sensor of voltage and load 16, the electric power such as the teeth of a comb is changed to the smooth electric power curve. The control switch 12 is arranged between the power coil 19 and control coil 11 in this example for currying out the invention. In this case, we can use the control switch 12 for low resistance of voltage. However it is possible to arrange the control switch 12 between the control coil 11 and solenoid coil 14.

In case of having two power sources with different voltage in the generator as shown in FIG. 4, the voltage is reduced in one side of power sources when the power is increased much more in the another side of power sources. Then it is decided priority power source and controller 18 supply the power to the priority power side and cut sending the power to the another side of power source. The storage battery 24 and 25 are very important part for storage to supply electric power into the loads 17L and 23.

Figure 7:
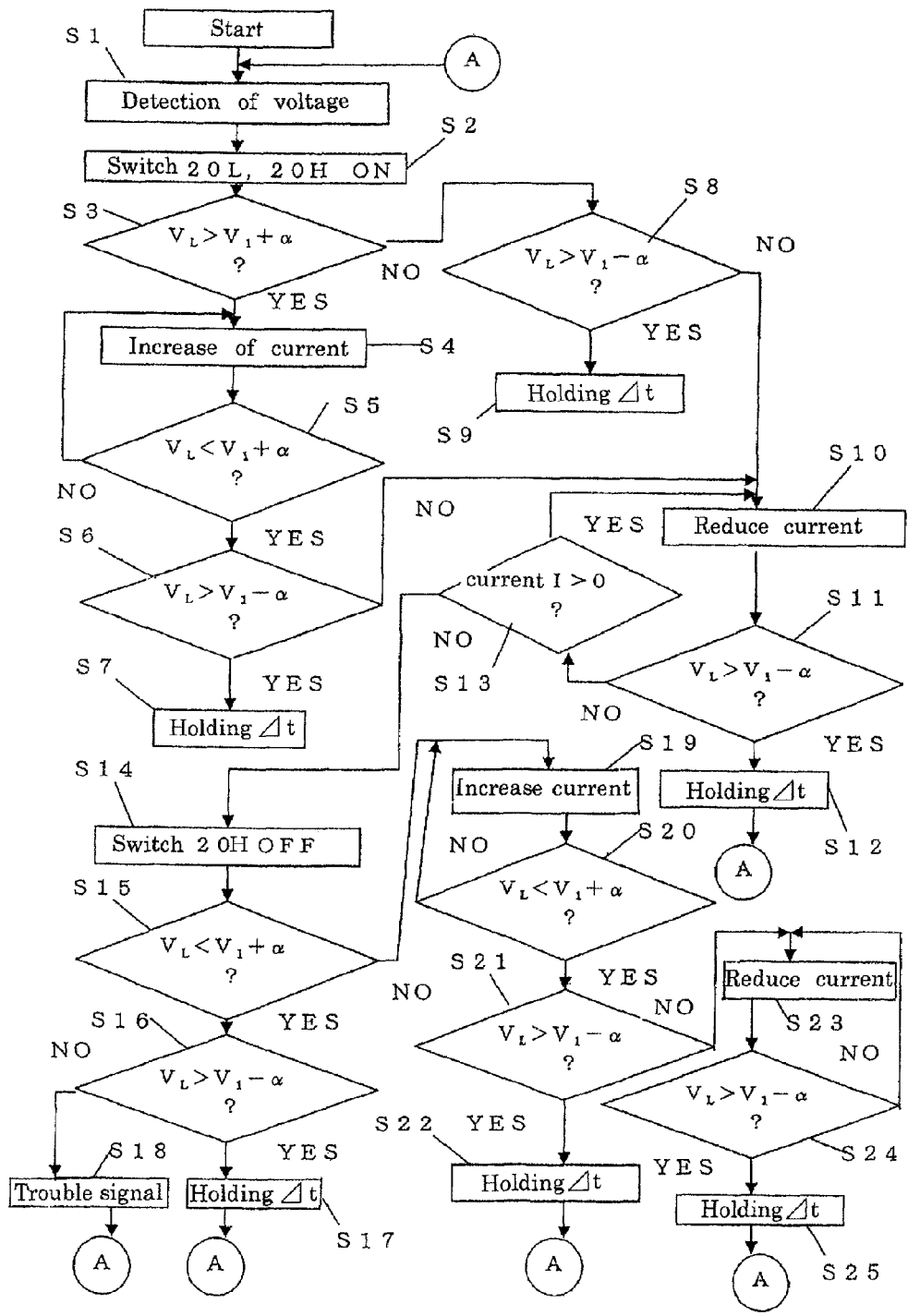
FIG. 7 is the flow chart of the controller is shown in the drawing to be worked for the generator shown in FIG. 4.

Control action of generator as shown in FIG. 4 is explained in the following of flow chart as shown in FIG. 7. In an aspect of the present invention, the generator has two power sources for example 14V and 100V, which are generated in one generator, therefore, the generator has two rectifiers 15, 21 and two loads 17, 23 in the circuit. The power coil for lower voltage is 19L and the power coil for higher voltage is 19H in the power coil 19. The power coil for lower voltage 19L is connected with switch 20L, rectifier 15 and load 17 in series and the power coil for higher voltage 19H is connected with switch 20H, rectifier 21 and load 23 in series. The sensor of voltage and load 16 and 22 are connected with the load 17 and 23 in parallel each together in order to compare the power voltage with the voltage set in advance. Hereinafter, the voltage set in advance is referred to as the designated voltage. The power coils 19L and 19H are decided the winding number of coils so as to produce 14V and 100V then the controlling one side of voltage constantly is same as controlling another side voltage constantly. The controller 18 check the voltage in the power coil for lower voltage 19L and the power coil for higher voltage 19H (step S1), and switch on the power switch 20L and power switch 20H (step S2), after that the voltage in the power coil VL which is main power is compared with high level voltage (V1+α) which is higher level of the designated voltage in the allowance (step S3). When voltage in the power coil VL is higher than (V1+α) which is higher level of the designated voltage in the allowance, the controller 18 makes the control switch 12 flow the current into the control coil 11 (step S4), as the result, voltage of power coil for lower voltage 19L reduce because of the down character of voltage in increased current flowing into the control coil 11. When voltage in the power coil VL value is lower than (V1+α) which is higher level of the designated voltage in the allowance (step S5) and the voltage in the power coil VL is higher than (V1−α) which is lower level of the designated voltage in the allowance, (step S6) controller 18 maintain the condition for very little time (step S7). On the other hand, when the controller 18 senses that voltage VL in the power coil for lower voltage 19L is lower than (V1+α) which is higher level of the designated voltage in the allowance in step S3, controller 18 forward next work of step S8. The controller 18 investigates if voltage in the power coil VL is larger than (V1−α) which is lower level of the designated voltage in the allowance, and voltage in the power coil VL is smaller than (V1−α) which is lower level of the designated voltage in the allowance, when voltage in the power coil VL is larger, (step S8) controller 18 leave the condition intact, (step S9) when voltage in the power coil VL is smaller, the controller 18 makes the control switch 12 flow the current into the control coil 11 (step S10) and controller admit the voltage in the allowance. After step S10, controller 18 check the voltage if voltage in the power coil VL is larger than (V1−α) which is lower level of the designated voltage in the allowance, (step S11), then controller 18 leave the condition intact (step S12) in case of that voltage in the power coil VL is larger than (V1−α) which is lower level of the designated voltage in the allowance. When voltage in the power coil VL is smaller than (V1−α) which is lower level of the designated voltage in the allowance, current of control is checked and the current is reduced by controller in case of that the current is larger than 0 (step S13). When the current reduced to 0 ampere, the switch 20H is opened to increase the voltage of main power (step S14) then the controller check if voltage in the power coil VL is smaller than (V1+α) which is higher level of the designated voltage in the allowance (step S15). In case of opening the switch 20H, electric power is supplied from the storage battery 25 to the higher voltage side 20H. When voltage in the power coil VL is smaller than (V1+α) which is higher level of the designated voltage in the allowance, the controller 18 check if the voltage is larger than (V1−α) which is higher level of the designated voltage in the allowance, (step S16) if so, leave the condition intact (step S17). In case of that voltage in the power coil VL is smaller than (V1−α) which is lower level of the designated voltage in the allowance, the controller sends the trouble signal for user (step S18). When VL is larger than (V1+α) which is higher level of the designated voltage in the allowance in step S15, controller reduce the current I in order to increase the voltage (step S19). After increasing the current, the controller 18 investigates if the voltage is kept in the allowance (steps S20 and S21), after that when voltage in the power coil VL is smaller than (V1−α) which is lower level of the designated voltage in the allowance, controller reduce the current I till voltage VL put in the allowance (V1±α) (steps S23 and S24). In the case of putting voltage VL in the allowance (V1±α), the controller is leaved the condition intact (steps S22 and S25). Controller 18 repeat those actions mentioned above.

A generator controlled voltage by winding coil in accordance with the other example of the present invention will be hereinafter described with reference to the drawing FIG. 5 and FIG. 8. Although the voltage of power coils 19L and 19H are different because of different winding number, those coils 19L and 19H can be used for getting same voltage.

The generator has two kinds of winding coils, a rectifier and load having one kind of voltage in the circuit of the generator to increase the voltage at low speed condition. The power coil 19 connected with the power coil for lower voltage 19L, the power coil for higher voltage 19H, control switch 12, control coil 11 and solenoid coil 14 in series. Furthermore, the power coil for lower voltage 19L is connected with power switch 20L, the rectifier 15 and the load 17 in series and the power switch 20H is connected with power switch 20L between the power coil for higher voltage 19H and lead wire 41 in parallel. The sensor of voltage and load 16 is connected with load 17 in parallel and the controller 18, control switch 12, power switch 20L, and power switch 20H according to the signal of the sensor of voltage and load 16 and speed and position sensor 28. The purpose of circuit is that power voltage is too low in the low generator speed then the coil having large winding number 19H is used at low speed condition and the coil having small winding number 19L is used for above medium speed condition in order to get high power at low speeds. In the system, as the designated voltage for example 12V is checked in the sensor of voltage and load 16 and controller 18 control the voltage by adjusting the current flowing into the control coil 11, the controller 18 can get the designated voltage in case of producing higher voltage than 12V, however it can not generate the power having 12V in the generator in case of that electric power in the power coil for lower voltage 19L is not over 12V. In the condition mentioned above, the circuit is very useful to get high power in the extremely low speed and to get high power in the high speed.

Figure 5:
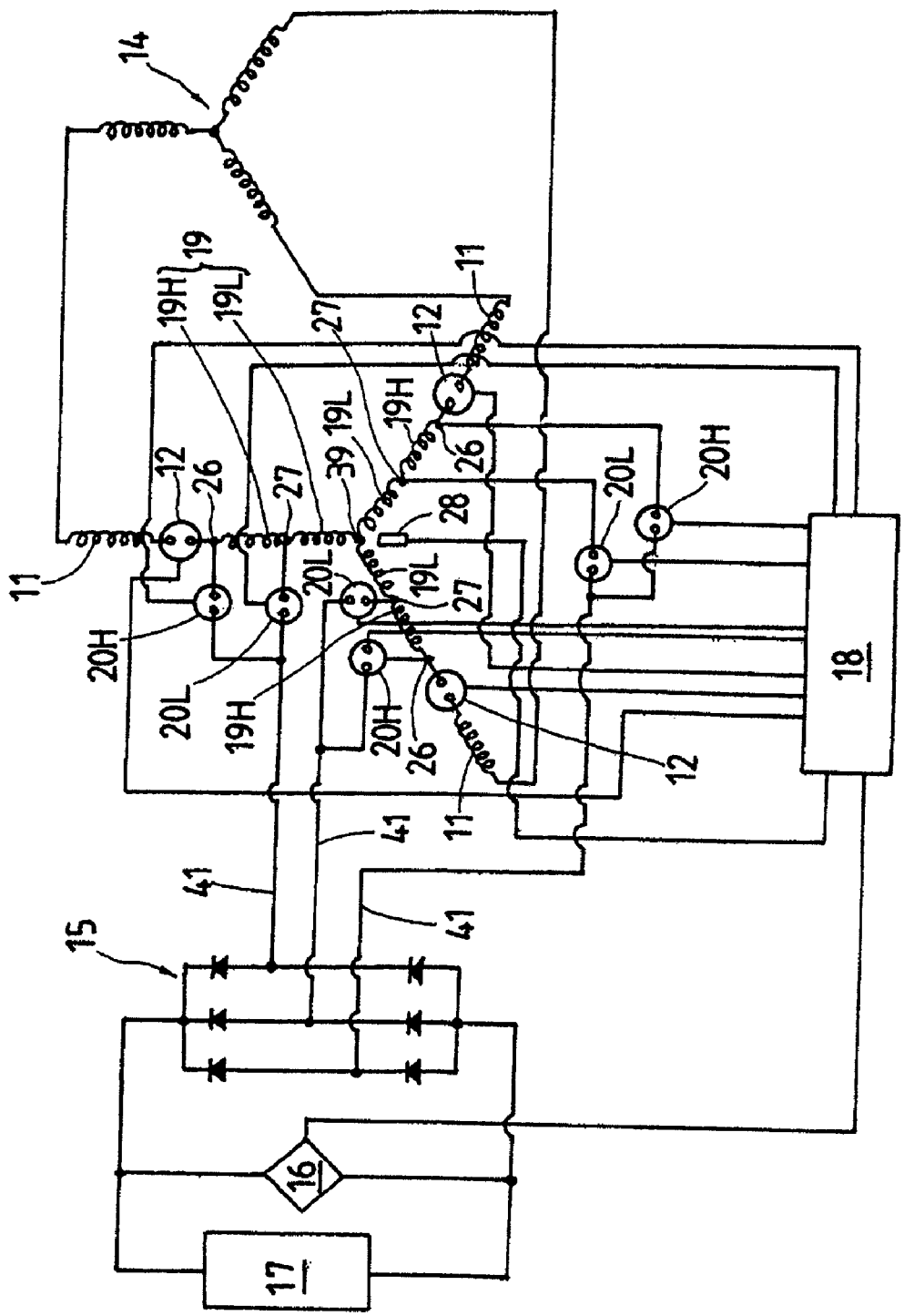
FIG. 5 is a wiring diagram explaining an example of other circuit connection in the generator and controller in an aspect of the present invention is shown in this drawing.
Figure 8:
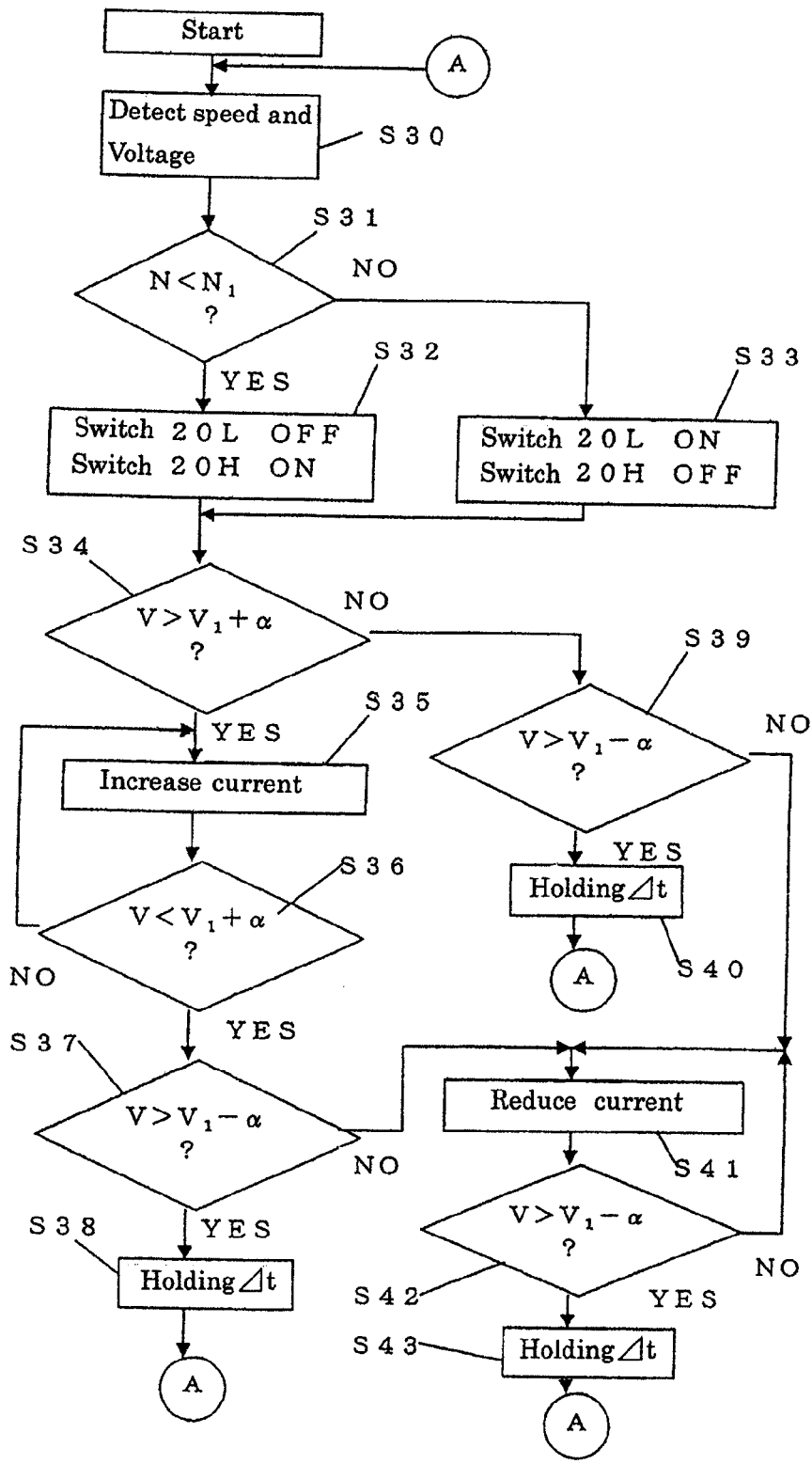
FIG. 8 is the flow chart of the controller is shown in the drawing to be worked for the generator shown in FIG. 5.

Operation of the controller in the generator circuit as shown in FIG. 5 is explained by using FIG. 8. The controller 18 detects the speed of generator and the generated voltage (step S30) after starter switch is operated and check the speed N of generator if it is lower than designated speed N1 which is decided before (step S31). When the speed N is lower than N1, the power switch 20L is opened and the power switch 20H is closed (step S32) to use the power coil with larger winding number. Then the controller 18 check the load voltage if the voltage put the allowance of voltage which is (V1±α), (step S33) when the voltage V is larger than (V1+α) which is higher level of the designated voltage in the allowance, where V1 is the designated voltage (for example V1 is 14 V) (steps S34 and S36) the current of control coil 11 is increased, (step S35,) and when the voltage V is smaller than (V1−α) which is lower level of the designated voltage in the allowance, the controller 18 intact the control switch 12 for 2~3 millisecond and when the voltage V is smaller than lower level of the designated voltage in the allowance (V−α) (step S39), the controller 18 reduce the current flowing into the control coil 11 (step S41). In case of that the generator speed is larger than designated speed N1, power switch 20L is closed and power switch 20H is opened (step S33). After Controlling the switch, the controller 18 checked voltage V if the voltage is contained in the allowance (V1±α) and when voltage V is larger than (V1+α) which is higher level of the designated voltage in the allowance, the controller makes the current flowing into control coil 11 increase by using the control switch 12 (step S36) furthermore, when voltage V is smaller than (V1−α) which is lower level of the designated voltage in the allowance, the controller 18 reduce the current flowing into control coil 11 by chopping method in the control switch 12 (steps S37, S39, S41 and S42). In case of that the voltage V is contained in the allowance V1±α, the controller 18 leave the control switch 12 intact for 2~3 millisecond. (steps S38 and S40, step S43), and the controller return the control flow to start position A.

Figure 9:
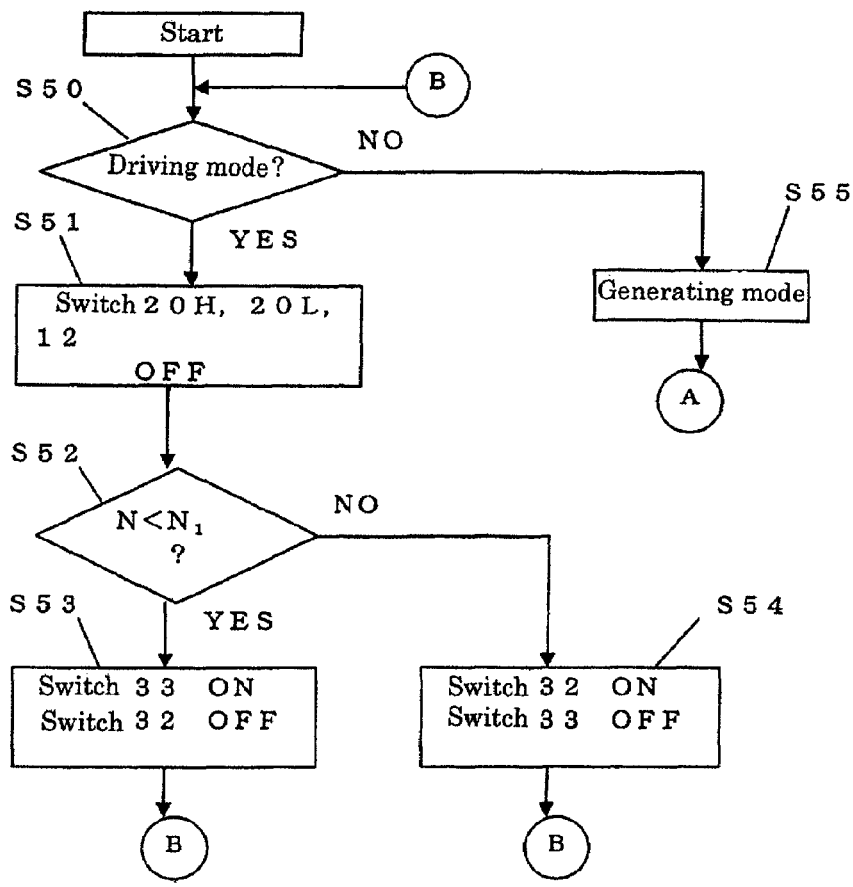
FIG. 9 is the flow chart of the controller is shown in the drawing to be worked for the generator shown in FIG. 6.

A generator controlled voltage by winding coil in accordance with the other example of the present invention will be hereinafter described with reference to the drawing FIG. 6 and FIG. 9.

The generator is used for starter for example it is used in a hybrid vehicle. In order to work the generator for a starter motor, the pole of electromagnetic must be produced in the stator corresponding to the pole of permanent magnet member 7. The controller 18 perceives the position of permanent magnet member 7 and makes the switch 32 and 33 flow a current from buttery 30. It is very important to flow current into the power coils 19H and 19L on the optimum timing and commutator is used in the starter system generally. Although mechanical contact system was used in ancient times for commutator, an optical position sensor is used recently, then the generator side controller 18 makes the power switch for higher voltage 20H connected with the power coil for higher voltage 19H having a large number of windings flow current in order to work the generator for starter and makes the power switch for lower voltage 20L connected with the power coil for lower voltage 19L having a small number of windings flow current to assist driving motor for vehicle which is used a internal combustion engine. The circuit of the starter-generator system is shown in FIG. 6. According the circuit, a switch 33 is connected with the power coil for higher voltage 19H having large winding number, connecting line 42H and battery 30 in series, and a switch 32 is connected with the power coil for lower voltage 19L having small winding number, connecting line 42L and battery 30 in series. The circuit of generator system is included in the starter-generator system as shown in FIG. 6. When the generator side controller 18 receives the signal of starter, the controller 18 must judge on the system condition if the generator must be operated for starter or generator. As large torque is required to drive the generator for starter, the generator side controller 18 select the power coil for higher voltage 19H having a large number of windings to flow the current, however driving torque reduce as speed of motor increase quickly because of producing the reverse electromotive force in the power coil. When speed in engine connected with the generator increase to high, the generator side controller 18 changes the flowing line of current from connecting line 42H to 42L. In case of using the power coil for lower voltage 19L having small winding number, the generator side controller 18 switch off the power switch 20L, 20H, and generator side control switch 12 and the controller 18 switch on the electric motor side switch 33 and switch off the electric motor side switch 32 in high speed condition. Then the generator is used for assistant motor because the generator maintain driving torque at high speed due to small reverse electromotive force in the power coil for lower voltage having small winding number. When the generator is used for motor, the switch of generator 20H and 20L and the generator side control switch 12 are switch off then the generator side controller 18 makes the electric motor side switches 32 and 33 operate suiting user requirement.

Figure 3:
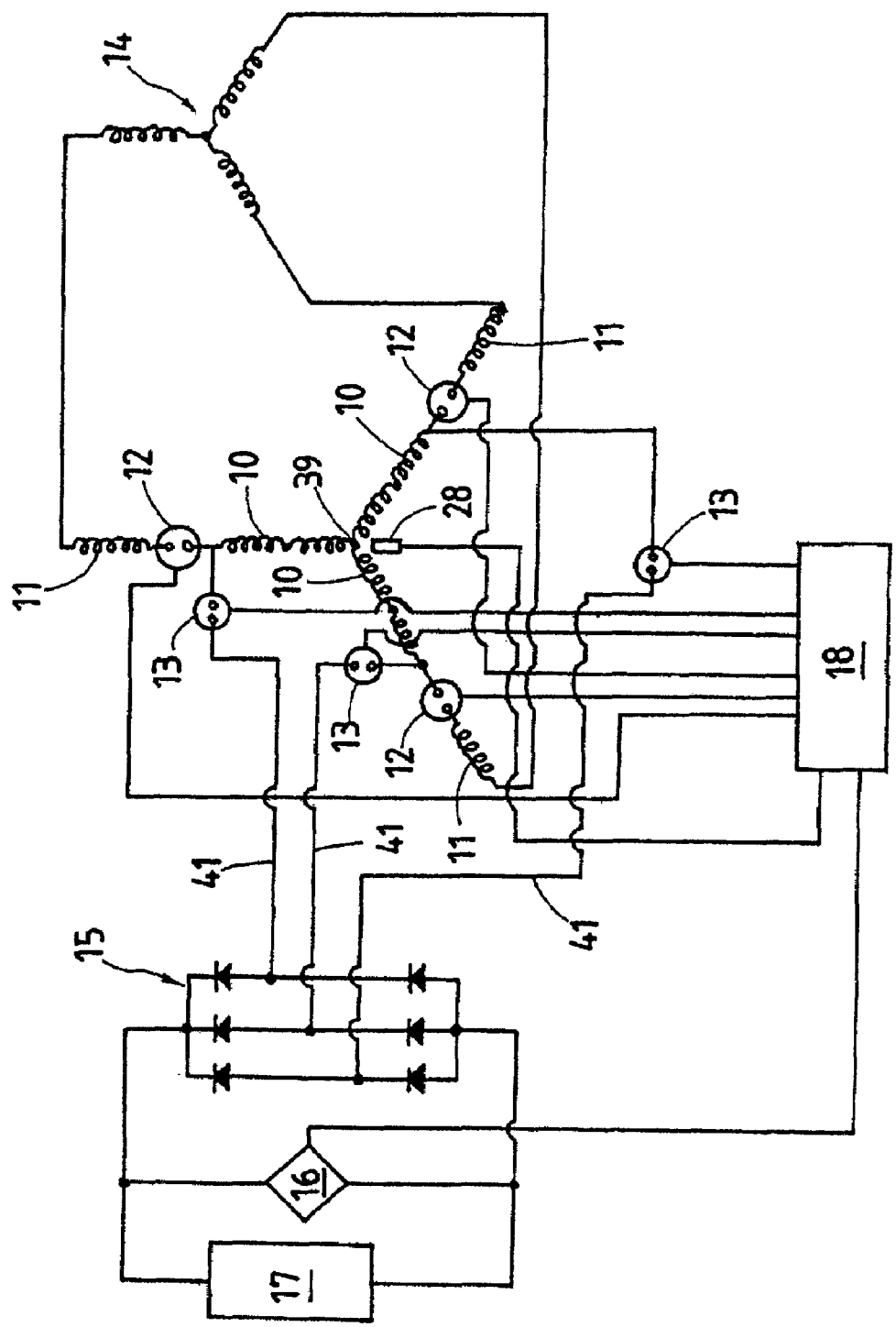
FIG. 3 is a wiring diagram explaining an example of circuit connection in the generator and controller in an aspect of the present invention is shown in this drawing.
Figure 6:
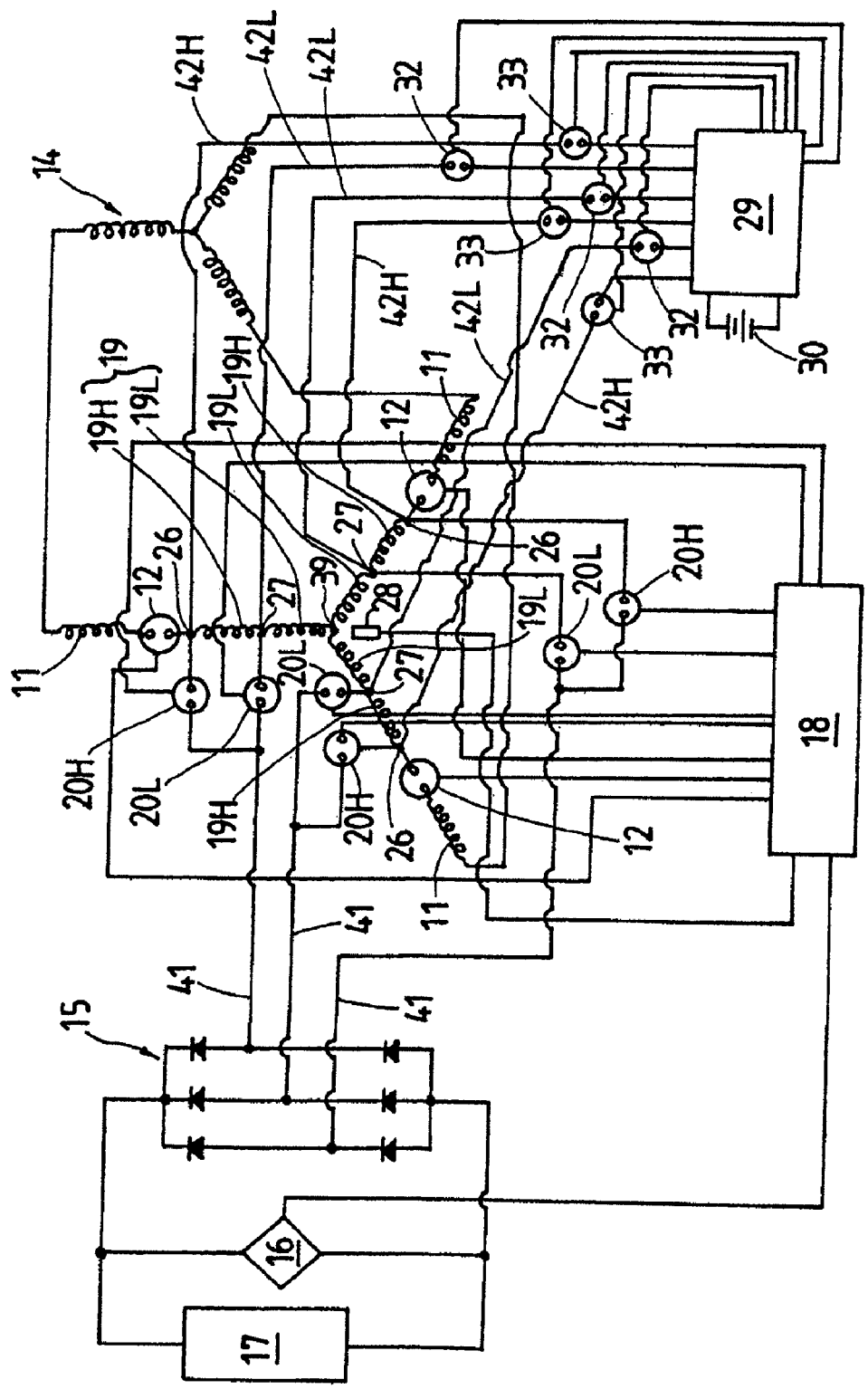
FIG. 6 is a wiring diagram explaining an example of circuit connection in the generator and controller which is used for a hybrid motor in an aspect of the present invention is shown in this drawing.

Furthermore, one example which the power coils connected in series are used by changing suitable for the requirement of user is explained in FIG. 6, however it is possible to use the generator for a motor which has single power coil, the electric motor side controller 29, storage battery 30, and switch 32 as shown in FIG. 3.

The work of generator and controller in accordance with the present invention will be hereinafter described with reference to the accompanying drawing FIG. 6 and FIG. 9.

Figure 10:
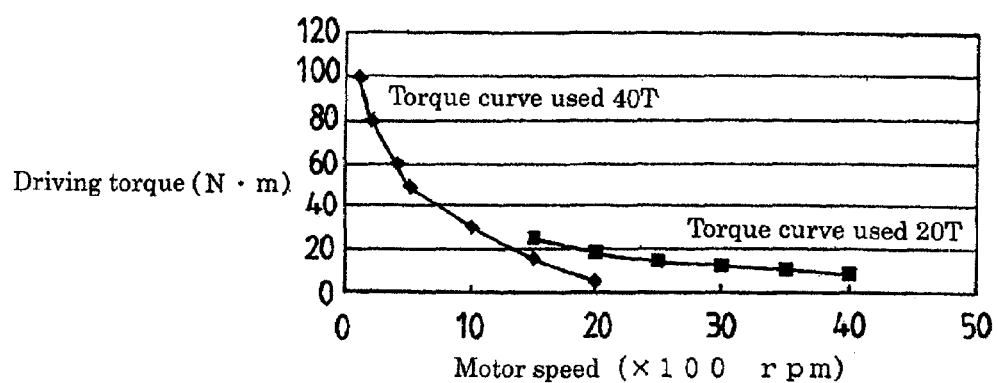
FIG. 10 is the experimental data which is shown in the graphic representations showing driving torque and speed (rpm), when the generator with the coil having a large number of windings and the coil having a small number of windings is used for hybrid motor.

The controller judge the generator operation if it is worked for generator or motor (step S50). If the controller is judged it for motor condition, the controller 18 is switched off the power switches 20H and 20L, and the generator side control switch 12, because those switches are worked for generator (step S51). The generator side controller 18 check the speed of generator (step S52) and when generator speed N is smaller than N1, the controller switch on the switch 33 and switch off the switch 32, because the generator is used for starter (step S53). If the speed of generator N is larger than N1, the controller 18 switch on the switch 32 and switch off the switch 33, because the generator is used for driving assist on a hybrid vehicle (step S54). The position of flowing current into power coil 19 is decided automatically by the signal of sensor 28. In this system, the controller 18 send the signal to open and close to the switch 32 and 33 then the current of flowing into the power coil 19 produce the electromagnetic force automatically in order to drive the motor. On the other hand, when the controller 18 inputted the program of current flowing such as a sine curve, make the switch flow the current, the motor efficiency is improved much more. When controller 18 is judged that the operation on the system is generator, the controller 18 makes the system work for the generator (step S55). When the generator is used for motor, which coil is winded by 20 turns and 40 turns, the experiment was carried out. The data is shown in FIG. 10. We can understand that large torque was get in large winding number coil, and driving torque was extended to high speed condition in the coil with small winding number.

The generator and control system in accordance with the present invention is very effective to improve the vehicle efficiency. When the system is used for vehicle, industrial generator, wind turbine and electric car, we can get constant voltage, high power and high efficiency in spite of small size, light weight and cheap cost.

The invention claimed is:

1. A controller of a permanent magnet generator, comprising:
    a rotor shaft rotatably supported by a housing;
    a rotor fixed to the rotor shaft, and mounted with a plurality of permanent magnet members on an outer periphery side; and
    a stator disposed at the outside of the rotor and wound with a winding coil;
    wherein the winding coil of the stator is formed of a power coil and a control coil connected in series to the power coil and larger in the number of windings than the power coil, and a power terminal is provided at least between the power coil and the control coil, and a switch for letting flow a part of a current generated in the power coil to the control coil and a controller for controlling a current amount flowing into the control coil by controlling ON/OFF of the switch so that a generated voltage is controlled to a voltage set in advance in response to a detection signal from a sensor for detecting the generated voltage by the power coil are provided.

2. The controller of the permanent magnet generator according to claim 1, wherein the power coil is connected in series with a plurality of winding coils, and a plurality of power terminals are provided.

3. The controller of the permanent magnet generator according to claim 2, wherein the power coils are the plurality of winding coils mutually different in the number of windings, and the plurality of power terminals output mutually different voltages.

4. The controller of the permanent magnet generator according to claim 1, wherein the control coil comprises a solenoid coil disposed at a position not interlinked with a magnetic flux of the rotor.

5. The controller of the permanent magnet generator according to claim 1, wherein the switch is disposed between the power coil and the control coil.

6. The controller of the permanent magnet generator according to claim 4, wherein the power coil and the control coil are connected by star-connection or delta-connection as a three-phase AC generator, the end portion of the solenoid coil is connected in a star shape, and the power terminals of U, V, and W phase of the three-phase AC are connected to a rectifier, respectively, a load is sent with a power, and the power coil is provided with the power terminal of a single voltage or a plurality of different voltages.

7. The controller of the permanent magnet generator according to claim 3, wherein the plurality of power terminals of the power coil are provided with a power switch for performing output switching, respectively, and the controller performs a control such that, when a rotational speed of the rotor is low, the power switch of the power terminal by the side of the large number of windings of the power coil is turned ON, and at the same time the power switch of the power terminal by the side of the small number of windings of the power coil is turned OFF, and when the rotational speed of the rotor is high, the power switch of the power terminal by the side of the small number of windings of the power coil is turned ON, and at the same time the power switch of the power terminal by the side of the large number of windings of the power coil is turned OFF.

8. The controller of the permanent magnet generator according to claim 1, wherein a voltage of the power terminal of the power coil and a voltage of the control coil have a relationship of the output side voltage=the control side voltage×(the output side number of windings)/(the control side number of windings), and can increase and decrease the current amount flowing into the control coil by the switch.

9. The controller of the permanent magnet generator according to claim 1, wherein the controller regulates the current amount flowing into the control coil by duty-controlling the switch and controls the generated voltage to the voltage set in advance.

10. The controller of the permanent magnet generator according to claim 1, wherein the controller duty-controls the switch in response to the detection signal form the sensor, when the generated voltage is high, increases the current amount flowing into the control coil, and when the generated voltage is low, decreases the current amount flowing into the control coil, thereby controls the generated voltage to the voltage set in advance.

11. The controller of the permanent magnet generator according to claim 3, wherein the plurality of power terminals of the power coil are provided with a power switch for performing output switching, respectively, and the controller, based on the output voltage of the power terminal connected with a main power source, controls the current amount flowing into the control coil, thereby obtains the voltage set in advance.

12. The controller of the permanent magnet generator according to claim 11, wherein the controller performs a control such that, when the main power source is required to supply an excessive power, the power switch provided in the power terminal connected with the main power source is turned ON and the other power switch is turned OFF.

13. The controller of the permanent magnet generator according to claim 3, wherein the plurality of power terminals for outputting different voltages are connected with either of a rectifier or a storage battery, respectively, the controller controls the current amount flowing into the control coil in response to a variation of a voltage of a load of the rectifier or the storage battery which is a main power source, and controls the generated voltage to the voltage set in advance.

14. The controller of the permanent magnet generator according to claim 1, wherein the power terminal of the power coil is provided with a generator side switch for ON/OFF-controlling a connection with the power terminal and a load by an instruction from the controller of the generator side and an electric motor side switch for ON/OFF-controlling a connection with an electric motor side storage battery and the power terminal by an instruction from an electric motor side controller, and the switch and the generator side switch are turned OFF by the instruction from the generator side controller, the electric motor side switch is turned ON by the instruction from the electric motor side controller, and while detecting a position of the rotor, the power coil is supplied with a current from the electric motor side storage battery, thereby drives the rotor.

15. The controller of the permanent magnet generator according to claim 3, wherein the power terminals provided in the plurality of power coils different in the number of windings are directly connected in series to an electric motor side switch and a storage battery connected in series, and the electric motor side switch is controlled by the controller so that the current flows to the power coil selected in response to a signal of a rotational speed.

16. The controller of the permanent magnet generator according to claim 15, wherein the controller performs a control such that, when a driving force is increased in a state in which a number of rotations of the rotor is large, the electric motor side switch connected to the power coil of the small number of windings is closed so as to supply the current, and at the same time, the electric motor side switch connected to the power coil of the large number of windings is opened, and when the driving force is increased in a state in which the number of rotations of the rotor is small, the electric motor side switch connected to the power coil of the large number of windings is closed so as to supply the current, and at the same time, the electric motor side switch connected to the power coil of the small number of windings is opened.

* * * * *